June 2, 1970     P. F. HAYNER ET AL     3,515,346

FLUID TEMPERATURE SENSITIVE VALVE

Filed May 8, 1968

*INVENTOR*
PAUL F. HAYNER
DAVID G. ELDRIDGE
BY

*ATTORNEY*

United States Patent Office 3,515,346
Patented June 2, 1970

---

3,515,346
FLUID TEMPERATURE SENSITIVE VALVE
Paul F. Hayner, Lexington, Mass., and David George Eldridge, Nashua, N.H., assignors to Sanders Associates, Inc., Nashua, N.H., a corporation of Delaware
Filed May 8, 1968, Ser. No. 727,420
Int. Cl. F01p 7/16
U.S. Cl. 236—34.5         9 Claims

ABSTRACT OF THE DISCLOSURE

The present invention pertains to a fluid thermostat and more particularly to a fluid thermostat for use in conjunction with hydraulic systems characterized by the generation of heat. The fluid thermostat is disposed in external feedback path from the hydraulic system to the sump wherein the fluid is fed to the system. The fluid thermostat is operative to pass fluid below a predetermined temperature directly to the sump and fluid above a predetermined temperature to a heat exchanger and then to the sump so as to provide a proportional fluid temperature device which maintains the fluid in the sump, and thus, the fluid fed to the hydraulic system, at a substantially constant temperature.

BACKGROUND OF THE INVENTION

The fluid thermostat of the present invention is intended for use in all fluid flow systems wherein there is a temperature regulation requirement. The invention is particularly well suited and primarily intended for use in conjunction with hydraulic systems. In hydraulic systems in the fluid temperature is extremely important in that the fluid viscosity is directly dependent thereon and varies greatly with temperature changes. Thus, if the viscosity of the fluid is too low then leakage from the system is too high; conversely, if the viscosity is too high the response of the system becomes exceedingly sluggish and the response time becomes very slow.

Prior art methods to provide fluid temperature compensation for hydraulic systems have employed a temperature sensing device positioned in an external feedback loop whereby the temperature sensing device would supply a signal to an amplifier which operated a complex control valve to proportion the flow of fluid to the heat exchanger and the sump supplying the system.

SUMMARY OF THE INVENTION

The advantage of the present invention is the provision of a simple, self-contained, automatically operable fluid flow proportioning device which does not require any complex control valves or other externally disposed apparatus in conjunction therewith, as in prior art devices, as mentioned hereinabove.

Another advantage of the present invention is that laminar flow conditions are always maintained, independent of fluid temperature, whereby there is no excess noise generation. The above results are accomplished by utilizing the differential coefficient of expansion of two materials to directly control the fluid flow of the device without requiring the use of intermediate mechanisms or circuitry, as was the requirement existent hereinbefore. The fluid flow remains fixed due to the direct control thereof and this provides a constant pressure drop across the device which is independent of the fluid temperature; this also aids in maintaining a low noise generation level.

A further advantage of the present invention is that, in almost all perceivable applications thereof, no external power is required for the operation of the device.

Accordingly, it is an object of the invention to provide a new and novel fluid proportioning device for proportioning the flow therethrough in dependence upon the temperature of the fluid fed thereto.

It is another object of the present invention to provide a fluid thermostat for proportioning the flow of fluid therethrough which is of simple construction, easy and inexpensive to manufacture and which is very reliable.

It is yet another object of the present invention to provide a fluid thermostat which employs the differential coefficient of expansion of two dissimilar materials to proportion the fluid flow outwardly therefrom in dependence upon the temperature of the fluid fed thereto.

It is yet a further object of the present invention to provide a fluid thermostat of the aforedescribed type which provides for laminar fluid flow independent of fluid temperature, thereby preventing excess noise generation.

It is still another object of the present invention to provide a fluid thermostat which is operable to directly control the fluid flow therethrough without necessitating the use of externally connected apparatus.

It is still a further object of the present invention to provide a fluid thermostat which directly controls the fluid flow therethrough so as to provide a constant pressure drop across the device which is independent of fluid temperature.

It is yet a further object of the present invention to provide a fluid thermostat of the aforedescribed type which is self-contained and automatically operable without requiring the use of an external power input.

It is a further object of the present invention to provide a fluid thermostat of the aforedescribed type for use in conjunction with hydraulic systems characterized by the generation of heat; wherein the thermostat is positioned in an external feedback path from the system and is operative to proportion the flow of fluid from the outlet of the system to the sump so that the temperature of the fluid in the sump is substantially constant.

In one embodiment of the invention, a fluid thermostat is constructed having a substantially circular housing and is fabricated of a material having a relatively low thermal coefficient of expansion. The housing has an annular channel within which there is disposed a ring fabricated of a material having a relatively high thermal coefficient of expansion. The width or thickness of the ring is less than the width of the annular channel, whereby there is provided an outer annular peripheral space and an inner annular peripheral space. Both of the annular spaces are in fluid flow communication with the inlet port of thermostat and are constructed so as to provide laminar flow therethrough. The outer annular space and inner annular space are in fluid flow communication with the low temperature outlet port and the high temperature outlet port, respectively. When the temperature of the fluid flowing through the thermostat is above a preselected value, the ring expands radially outward and the entire fluid flow is from the inlet port to the high temperature outlet port. When the temperature of the fluid flowing through the thermostat is below a preselected value, the ring contracts radially inward and the entire fluid flow is from the inlet port to the low temperature outlet port. When the temperature of the fluid lies between both of the aforementioned preselected temperature values, then the fluid flow is proportioned between the low temperature and high temperature outlet ports.

BRIEF DESCRIPTION OF THE DRAWING

The above and other objects, features and advantages of the present invention will become more apparent from the following detailed description considered in conjunction with the following drawings, wherein.

Figure 1:
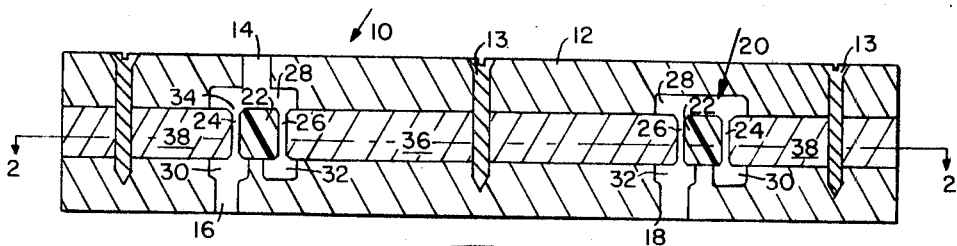
FIG. 1 is a sectional view of a preferred embodiment of a fluid thermostat constructed in accordance with the principles of the present invention.
Figure 2:
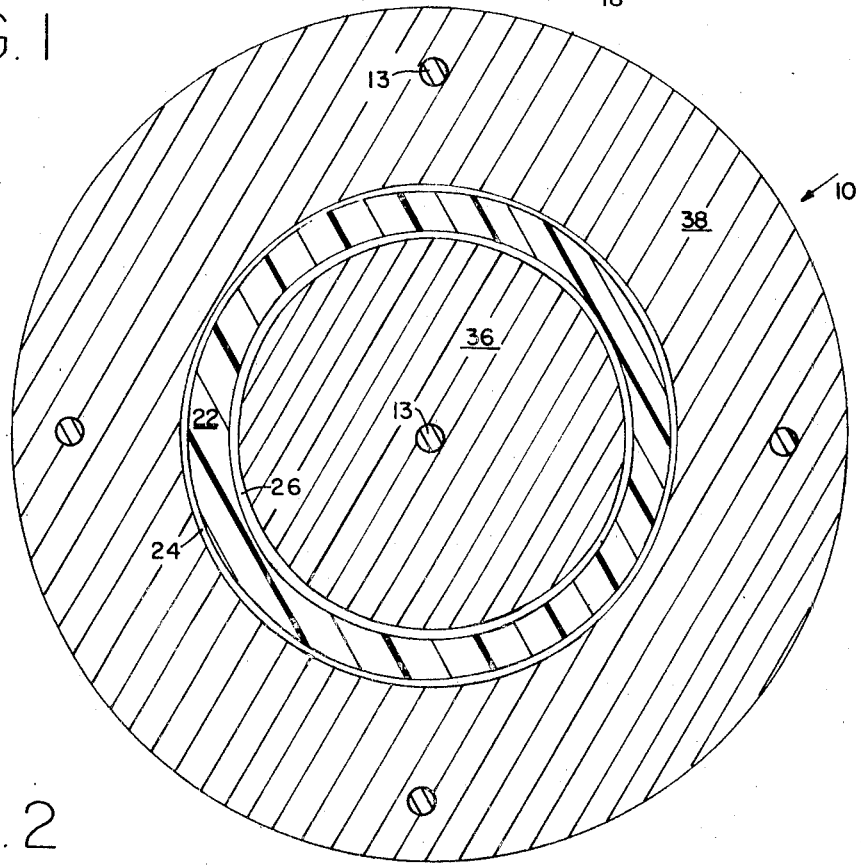
FIG. 2 is a sectional view of the thermostat taken on the line 2—2 of FIG. 1.

Referring now to the drawings, and more particularly to FIG. 1 thereof, there is shown a sectional view of a fluid thermostat 10 constructed in accordance with a preferred embodiment of the invention. The thermostat 10 includes a housing 12, an inlet port 14, a low temperature outlet port 16 and a high temperature outlet port 18. The housing 12 is of a circular configuration and is secured by means of screws 13, as seen in FIG. 2, and is fabricated of a material having a low thermal coefficient of expansion, for example stainless steel. Of course, the housing may be fabricated having other type of geometrical configurations such as rectangular, square, ellipitical etc., and from other type materials having a low thermal coefficients of expansion.

The housing 12 has an annular channel 20 formed therein within which there is positioned a toroidal member 22. The width of the toroidal member 22 is less than that of the channel 20, whereby there is formed an outer annular space or passage 24 and an inner annular space or passage 26.

The inlet port 14 is connected to an annular chamber 28 which is disposed above the member 22 and the annular passages 24 and 26 (as viewed in FIG. 1) and in fluid flow communication with said passages. The low temperature outlet port 16 is connected to an annular chamber 30 which is disposed below the toroidal member 22 and the passage 24 (as viewed in FIG. 1) and in fluid flow communication with said passage. Similarly, the high temperature outlet port 18 is connected to an annular chamber 32 which is positioned below the member 22 and the passage 26 (as viewed in FIG. 1) and in fluid flow communication with said passage.

The annular pasages 24 and 26 are tapered as at 34 in order to prevent oscillation of the thermostat 10 when the fluid is flowing therethrough.

The toroidal member 22 is fabricated of a high density polyethylene material having a high thermal coefficient of expansion. However, any other suitable material exhibiting a high thermal coefficient of expansion may be equally well employed, such as nylon.

The thermostat 10 is designed for operation within a selected temperature range having a lower limit and an upper limit, hereinafter termed low temperature cutoff and high temperature cutoff, respectively.

In the opeation of the thermostat 10, fluid enters via the inet port 14 and passes into the annular chamber 28. When the fluid temperature lies between the low temperature cutoff and high temperature cutoff, the annular passages 24 and 26 provides fluid paths therethrough from the chamber 28 to the annular chambers 30 and 32 and therefrom to the low temperature outlet port 16 and high temperature outlet port 18, respectively.

The fluid flowing from the chamber 28 to the chambers 30 and 32 passes over the toroidal member 22 which, as discussed hereinbefore, has a high thermal coefficient of expansion. When the temperature of the fluid passing over the toroidal member 22 is at, or lower than, the low temperature cutoff, the member 22 contracts in a radial direction and seats itself against the interior housing portion 36, thereby completely closing the annular passage 26 and preventing any fluid flow therethrough from the chamber 28 to the chamber 32 and, thus, the high temperature outlet port 18. Concomitantly with the closing of the annular passage 26, the width of the annular passage 24 is increased and a greater cross-sectional flow area is provided therethrough. This results in all the fluid fed to the inlet port 14 flowing through the passage 24 to the low temperature outlet port 16. Conversely, when the temperature of the fluid pasing over the toroidal member 22 is at, or higher than, the high temperature cutoff, the member 22 expands in a radial direction and seats itself against the interior housing portion 38. This completely closes the annular passage 24 and prevents any fluid flow therethrough, whereby there is no fluid flow to the low temperature outlet port 16. The radial expansion of the member 22 also results in an increase in the cross-sectional flow area through the annular passage 26 which results in full fluid flow from the inlet port 14 to the high temperature outlet port 18.

From the foregoing it is seen that the amount of fluid passing through the annular pasages 24 and 26 is a function of temperature, whereby the portion of fluid flow from the inlet 14 to the low temperature and high temperature outlets 16 and 18, respectively, through the annular passages 24 and 26 is dependent upon the temperature of the fluid, and directly controllable by the toroidal member 22, and in, particular the contraction and expansion thereof.

It is herein to be noted that the dimensions of the annular passages 24 and 26 are such that in all cases; i.e., whether there is full fluid flow, or no fluid flow, therethrough, laminar flow conditions are always maintained therein.

It is also to be noted that in some applications it may be desirable to fabricate the toroidal member 22 of a material having a low coefficient of thermal expansion and the housing 12 of a material having a high coefficient of thermal expansion, whereby the results would be the same as described hereinbefore, while the operation would be substantially opposite thereto.

Figure 3:
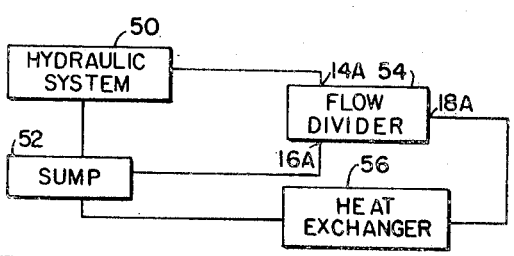
FIG. 3 is a block view of a hydraulic system constructed in accordance with the present invention and utilizing the fluid thermostat shown in detail in FIGS. 1 and 2.

Referring now to FIG. 3, there is shown a hydraulic system indicated generally by the reference numeral 50. The hydraulic system 50 is fed by a sump 52. A fluid flow divider 54, which is of the same basic construction as the thermostat 10 of FIGS. 1 and 2 is connected between the hydraulic system 50 and the sump 52 and is, for practical purposes, positioned in an external feedback path between the system 50 and the sump 52.

The output of the hydraulic system is fed to the inlet port 14A of the flow divider 54 which has a low temperature outlet port 16A and a high temperature outlet port 18A. The fluid flow from the low temperature outlet port 16A is fed directly to the sump, while the fluid flow from the high temperature outlet port 18A is fed to the sump through a heat exchanger 56.

A discussed hereinabove, the flow divider 54 is of the same basic construction as the thermostat 10, described in detail hereinbefore. In the operation of the system shown in FIG. 3, the fluid output of the hydraulic system 50 is fed to the inlet port 14A of the flow divider 54. When the temperature of the fluid fed to the inlet port 14A is between the low temperature and high temperature cutoff points of the flow divider 54, the fluid flow outwardly therefrom is proportioned between the low and high temperature outlet ports 16A and 18A, respectively, and is a function of the temperature of the entering fluid. Thus, with the above condition, part of the fluid flow is directly to the sump, from the low temperature outlet port 16A, and part of the fluid flow is to the sump through the heat exchanger 56; the heat exchanger 56 serving to reduce the temperature of the fluid flowing therethrough.

In the extreme case when the temperature of the fluid entering the flow divider 54 is at or below the low temperature cutoff the entire fluid flow is through outlet port 16A and the outlet port 18A is effectively shut off. Similarly, when the temperature of the entering fluid to the divider is at or above the high temperature cutoff all the fluid flow is through the outlet port 18A to the heat exchanger 56 and then to the sump 52 and the outlet port 16A is effectively shut off. In this manner the fluid flow through the flow divider will be proportioned between the outlet ports 16A and 18A in dependence upon the temperature thereof until the temperature of the fluid in the sump 52, and thus the outlet temperature of the hydraulic system 50, are substantially constant.

It is thus seen that we have provided a new and novel temperature compensated hydraulic system and fluid thermostat for use in conjunction therewith which is of simple construction and has great reliability.

It will be readily apparent to those skilled in the art that many modifications, changes and improvements may be made in applicant's invention without departing from the spirit, scope and teachings thereof as defined in the appended claims.

What is claimed is:

1. A temperature responsive flow control valve, comprising,
   a generally cylindrical housing formed to define an annular channel bounded in part by concentric inner and outer curved walls,
   said housing also being formed to define an annular inlet chamber and first and second annular outlet chambers, all three chambers communicating with said channel,
   said outlet chambers being formed adjacent to each other while said inlet chamber is formed axially opposite said outlet chambers, and
   a generally toroidal temperature responsive element which expands and contracts relative to said housing with temperature changes and which is located within said channel,
   said element also acting as the flow control element for said valve and being positioned with respect to said chambers so that said element varies the relative exposure and occlusion of said outlet chambers as it expands and contracts.

2. A temperature responsive flow control valve as claimed in claim 1 in which said element is positioned with respect to said chambers so that when fully expanded said element exposes said first chamber and occludes said second chamber and when fully contracted said element exposes said second chamber and occludes said first chamber.

3. A temperature responsive flow control valve as claimed in claim 1 in which said element is formed of a material having a temperature coefficient of expansion substantially different from that of said housing.

4. A temperature responsive flow control valve as claimed in claim 3 in which said element is formed of a high density polyethylene material.

5. A temperature responsive flow control valve as claimed in claim 1 in which said element is made of a single homogeneous material and has a width in the radial direction less than the distance between said inner and outer walls.

6. A temperature responsive flow control valve as claimed in claim 5 in which said inlet chamber spans and is wider than the distance between said inner and outer walls and in which said first and second output chambers each are narrower than said space with said first output chamber spanning a portion of said channel adjacent to its outer wall and said second outlet chamber spanning a portion of said channel adjacent to said inner wall, whereby radial expansion and contraction of said element varies the sizes of the passageways extending from said inlet chamber to said first and second outlet chambers.

7. A temperature responsive flow control valve as claimed in claim 6 in which the temperature coefficient of said element relative to that of said housing and the dimensions of said element relative to those of said channel and said chambers are selected so that at a first predetermined temperature said first outlet chamber is exposed and said second outlet chamber is occluded and at a second predetermined temperature said second outlet chamber is exposed and said first outlet chamber is occluded.

8. A temperature responsive flow control valve comprising,
   a generally cylindrical housing formed to define an annular channel having a generally rectangular cross section including convex and concave radially spaced inner and outer walls respectively,
   said housing also being formed to define an inlet and first and second outlet ports generally parallel to the axis of said cylindrical housing,
   said housing also being formed to define an annular inlet and first and second annular outlet chambers communicating with said inlet and said first and second outlet ports respectively and all of said chambers communicating with said channel,
   said inlet chamber radially spanning said channel from said inner to said outer wall, said first outlet chamber radially spanning a portion of said channel from said outer wall to a point intermediate said inner and outer walls and said second outlet chamber radially spanning a portion of said channel from said inner wall to a point intermediate said inner and outer walls,
   an annular element having a generally rectangular cross section formed of a material having a temperature coefficient of expansion substantially different from that of said housing and positioned within said channel,
   said element having a radial dimension less than the difference between said inner and outer walls,
   whereby expansion and contraction of said element relative to said housing varies the relative exposure and occlusion of said outlet chambers.

9. A temperature responsive flow control valve as claimed in claim 8 in which said element is formed by a high density polyethylene material.

References Cited

UNITED STATES PATENTS

| 1,610,434 | 12/1926 | Fletcher | 236—93 X |
| 2,582,324 | 1/1952 | Gailloud. | |
| 2,673,687 | 3/1954 | Alban | 236—93 |
| 2,792,178 | 5/1957 | Littleton | 236—12 |
| 1,000,435 | 8/1911 | Dagelsen | 236—34.5 |
| 2,400,615 | 5/1946 | Warrick et al. | 236—34.5 |
| 2,400,911 | 5/1946 | Booth | 236—34.5 |
| 2,419,630 | 4/1947 | Cruzan et al. | 236—34.5 |
| 2,457,618 | 12/1948 | Wiesendanger | 236—34.5 |
| 2,846,146 | 8/1958 | Arant | 236—20 |

FOREIGN PATENTS 1,210,330   9/1959   France.

EDWARD J. MICHAEL, Primary Examiner

U.S. Cl. X.R.

236—101